June 24, 1930. W. R. METTS 1,766,393
AUTOMOBILE WHEEL ATTACHMENT
Filed Aug. 3, 1928

William R. Metts
INVENTOR

BY Victor J. Evans
ATTORNEY

Patented June 24, 1930

1,766,393

UNITED STATES PATENT OFFICE

WILLIAM RUCE METTS, OF ATLANTA, GEORGIA

AUTOMOBILE WHEEL ATTACHMENT

Application filed August 3, 1928. Serial No. 297,139.

This invention relates to an attachment for vehicle wheels and the general object of the invention is to provide an attachment primarily designed for use on a vehicle wheel equipped with a pneumatic tire, to protect the tire in the event of under inflation, puncture, blow-out or the collapse thereof, as the attachment which is in the form of an auxiliary rim will come into use for supporting the load, with the result the tire will not be subjected to further injury or damage when running to a convenient place for repairs.

A further object of the invention is to provide a wheel attachment in the form of an auxiliary or emergency rim that is designed for all types of pneumatic tire carrying wheels and may be used in the capacity of a lifting device, by running the same up upon a suitable supporting means for the purpose of elevating the tire whereby it can be changed.

Another object of the invention is to provide an attachment for vehicle tires that will prevent possible wreckage of a vehicle equipped therewith or injury to the occupants of the vehicle in the event of a blow-out of one of the tires of the vehicle at high speed.

This invention consists in certain features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which.

Figure 2:
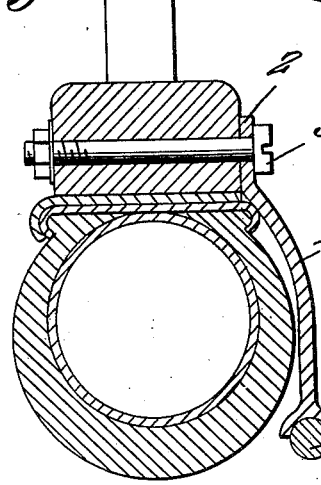
Figure 2 is a sectional view taken through the attachment applied to a spoked wheel.
Figures 3, 4:
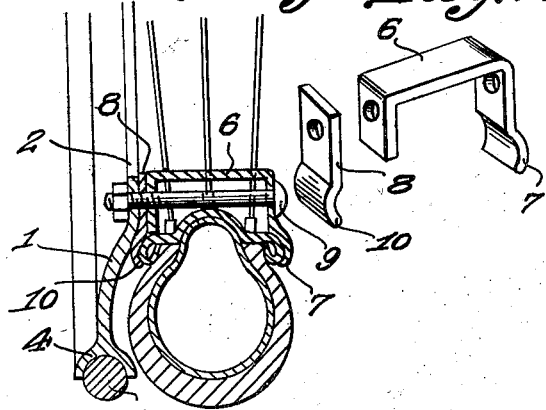
Figure 3 is a similar view of the attachment applied to a wire wheel.
Figure 4 is a perspective view of the parts for securing the attachment to a wire wheel.

Referring to the drawings in detail, it will be noted that the attachment can be applied to any type of vehicle wheel carrying a pneumatic tire and includes a relatively wide ring like body 1 that is curved transversely upon itself in order to follow the transverse curvature of the side wall of a tire as best shown in Figures 2 and 3 of the drawings, and formed with the inner circumferential edge of the body is an annular flange 2 which is provided with a plurality of openings for the purpose of receiving bolts 3 whereby the attachment may be secured to the felly of a wheel and upon either side thereof, the felly being provided with bores or openings to accommodate the bolts.

The body extends outwardly a suitable distance so as to terminate slightly above the road surface when the tire is fully inflated, and formed with the outer periphery of the body is a rim 4 which as shown is of rounded channel shape for the purpose of accommodating a solid cushion tire 5, circular in cross section.

Figure 1:
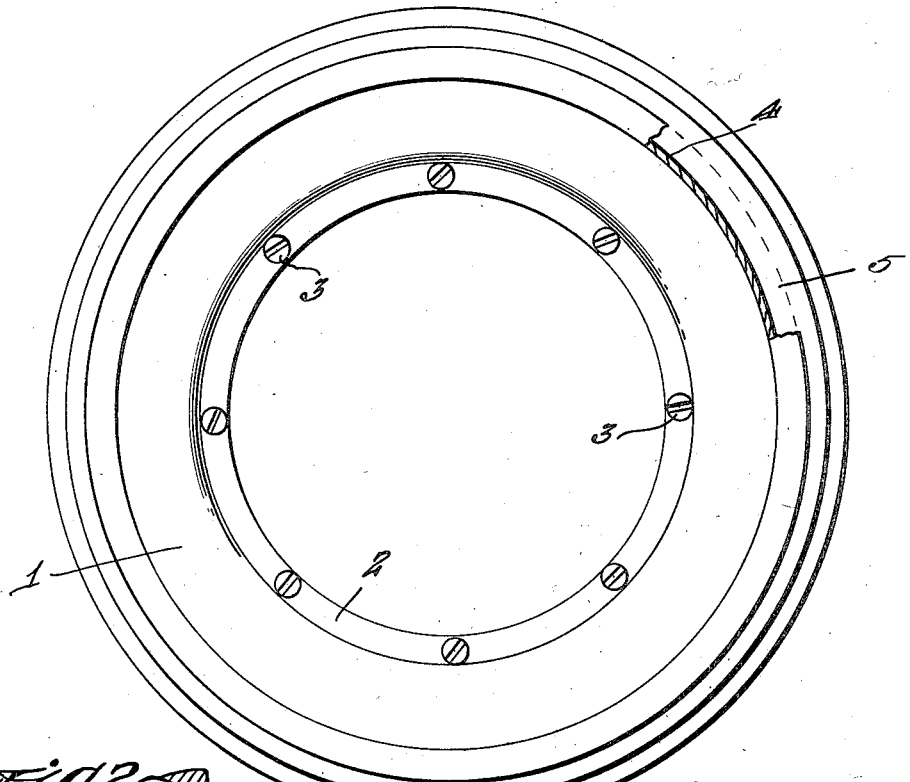
Figure 1 is a side elevational view illustrating one form of my attachment applied to a vehicle wheel of the disk type with a portion of the attachment broken away and in section.

As suggested in Figures 1 and 2, the flange 2 of the body is adapted to be disposed in contacting engagement with the felly, but when it is desired to apply the attachment to a wire wheel of the type as shown in Figure 3, I provide a substantially U-shape clamping plate 6 having openings formed in the arms thereof, and formed with one of said arms is a tongue 7 curved upon itself so as to fit one of the tire receiving flanges of the combined rim and felly as shown in Figure 3. Cooperating with the U-shape clamping plate is a lug 8 having a straight portion formed with an opening adapted to register with the opening of one of the arms for the passage of a bolt 9 which receives a nut whereby the attachment can be secured to the combined felly and rim. The lug 8 is further provided with a tongue 10 of a shape corresponding to that of the tongue 7 and the tongue 10 is engageable with the other tire receiving flange with the result that the attachment will be securely fixed in operative position for the purpose intended.

From the above description and disclosure of the drawings, it will be obvious that I have provided an auxiliary or emergency rim designed for the purpose of protecting vehicle wheels carrying pneumatic tires, and that in the event of under inflation or collapse of the tires due to damage thereof, the attachment will support the load of the vehicle and thereby prevent injury or further damage to the collapsed or under inflated tires as will be apparent.

It is thought from the foregoing description that the advantages and novel features of my invention will be readily apparent.

I desire it to be understood that I may make changes in the construction and in the combination and arrangement of the several parts provided that such changes fall within the scope of the appended claims.

What I claim is:

An attachment for a vehicle wheel carrying a pneumatic tire, comprising a relatively wide ring like body curved transversely upon itself to substantially follow the transverse curvature of the side walls of the pneumatic tire, a tire carrying rim formed with the outer periphery of said body, a flange formed with the inner periphery of said body, clamping means for cooperating with said flange for securing the attachment to the wheel and said clamping means including U-shape clamping plates having openings formed in the arms thereof, a curved tongue formed with one of said arms, lugs formed with openings adapted to register with the openings of the other arms, a tongue for each of the lugs, said flange being provided with openings registering with the openings of the arms and lugs respectively, bolt and nut connections having the bolts thereof passing through the registering openings, and said tongues being opposed and disposed in gripping engagement with a part of the wheel for securing the attachment thereto.

In testimony whereof I affix my signature.

WILLIAM RUCE METTS.